US008577948B2

(12) United States Patent
Srinivasan et al.

(10) Patent No.: US 8,577,948 B2
(45) Date of Patent: Nov. 5, 2013

(54) SPLIT PATH MULTIPLY ACCUMULATE UNIT

(75) Inventors: Suresh Srinivasan, Bangalore (IN);
Rajaraman Ramanarayanan,
Bangalore (IN); Sanu K. Mathew,
Hillsboro, OR (US); **Ram K.
Krishnamurthy**, Portland, OR (US);
Vasantha K. Erraguntla, Bangalore
(IN)

(73) Assignee: Intel Corporation, Santa Clara, CA (US)

( * ) Notice: Subject to any disclaimer, the term of this patent is extended or adjusted under 35 U.S.C. 154(b) by 544 days.

(21) Appl. No.: 12/886,012

(22) Filed: Sep. 20, 2010

(65) Prior Publication Data

US 2012/0072703 A1 Mar. 22, 2012

(51) Int. Cl.
*G06F 7/483* (2006.01)
(52) U.S. Cl.
USPC ........................................................ 708/501
(58) Field of Classification Search
None
See application file for complete search history.

(56) References Cited

U.S. PATENT DOCUMENTS

| 8,069,200 | B2 * | 11/2011 | Landers et al. | 708/501 |
| 8,078,660 | B2 * | 12/2011 | Quinnell et al. | 708/501 |
| 2005/0228844 | A1 * | 10/2005 | Dhong et al. | 708/501 |
| 2008/0071851 | A1 | 3/2008 | Zohar | |
| 2008/0091758 | A1 * | 4/2008 | Hansen et al. | 708/501 |
| 2008/0183791 | A1 * | 7/2008 | Ho et al. | 708/501 |
| 2008/0256150 | A1 | 10/2008 | Quinnell | |
| 2009/0077152 | A1 * | 3/2009 | Powell et al. | 708/501 |
| 2011/0040815 | A1 * | 2/2011 | Penton et al. | 708/205 |
| 2012/0072703 | A1 * | 3/2012 | Srinivasan et al. | 712/221 |

OTHER PUBLICATIONS

Tomas Lang et al., "Floating-Point Multiply-Add-Fuse with Reduced Latency", IEEE Transactions on Computers, vol. 53, No. 8, Aug. 2004, pp. 988-1003.
Son Dao Trong et al., "P6 Binary Floating-Point Unit", 18th IEEE Symposium on Computer Arithmetic, Montpellier, France, Jun. 25-27, 2007, 10 pages.
Intel Corporation, Intel Advanced Vecto Extensions Programming Reference, Aug. 2010, Document No. 319433-008, pp. 2-6-2-11.

* cited by examiner

*Primary Examiner* — David H Malzahn
(74) *Attorney, Agent, or Firm* — Trop, Pruner & Hu, P.C.

(57) ABSTRACT

In one embodiment, a processor includes a multiply-accumulate (MAC) unit having a first path to handle execution of an instruction if a difference between at least a portion of first and second operands and a third operand is less than a threshold value, and a second path to handle the instruction execution if the difference is greater than the threshold value. Based on the difference, at least part of the third operand is to be provided to a multiplier of the MAC unit or to a compressor of the second path. Other embodiments are described and claimed.

20 Claims, 9 Drawing Sheets

US 8,577,948 B2

SPLIT PATH MULTIPLY ACCUMULATE UNIT

BACKGROUND

Modern processors include various circuitry for performing operations on data. Typically, a processor is designed according to a given instruction set architecture (ISA). Many processors have a pipelined design that can be implemented as an in-order or out-of-order processor.

In either event, instructions are obtained via front end units, which process the instructions and place them in a form to be recognized by further components of the pipeline. Typically, so-called macro-instructions are broken up into one or more micro-instructions or uops. These uops may then be executed in different execution units of a processor. That is, many processors include multiple execution units including arithmetic logic units, address generation units, floating-point units and so forth.

One common execution unit is a multiply-accumulate unit, which may be in the form of a fused floating-point multiply-accumulate (FPMAC) unit. In general, a MAC unit can perform an operation on three incoming operands to first multiply two of the operands and then accumulate the product with the third operand. Some processors use such a unit to perform more simple mathematical operations such as additions, subtractions and multiplications by appropriate selection of the third operand. Accordingly, in many processors a MAC unit may form the backbone of the execution units and may be a key circuit in determining the frequency, power and area of the processor. In addition, MAC units can be heavily used in certain applications such as graphics and many scientific and engineering applications. Thus these units should be made to be as efficient in area, power consumption, and processing speed as possible.

DETAILED DESCRIPTION

Figure 1:
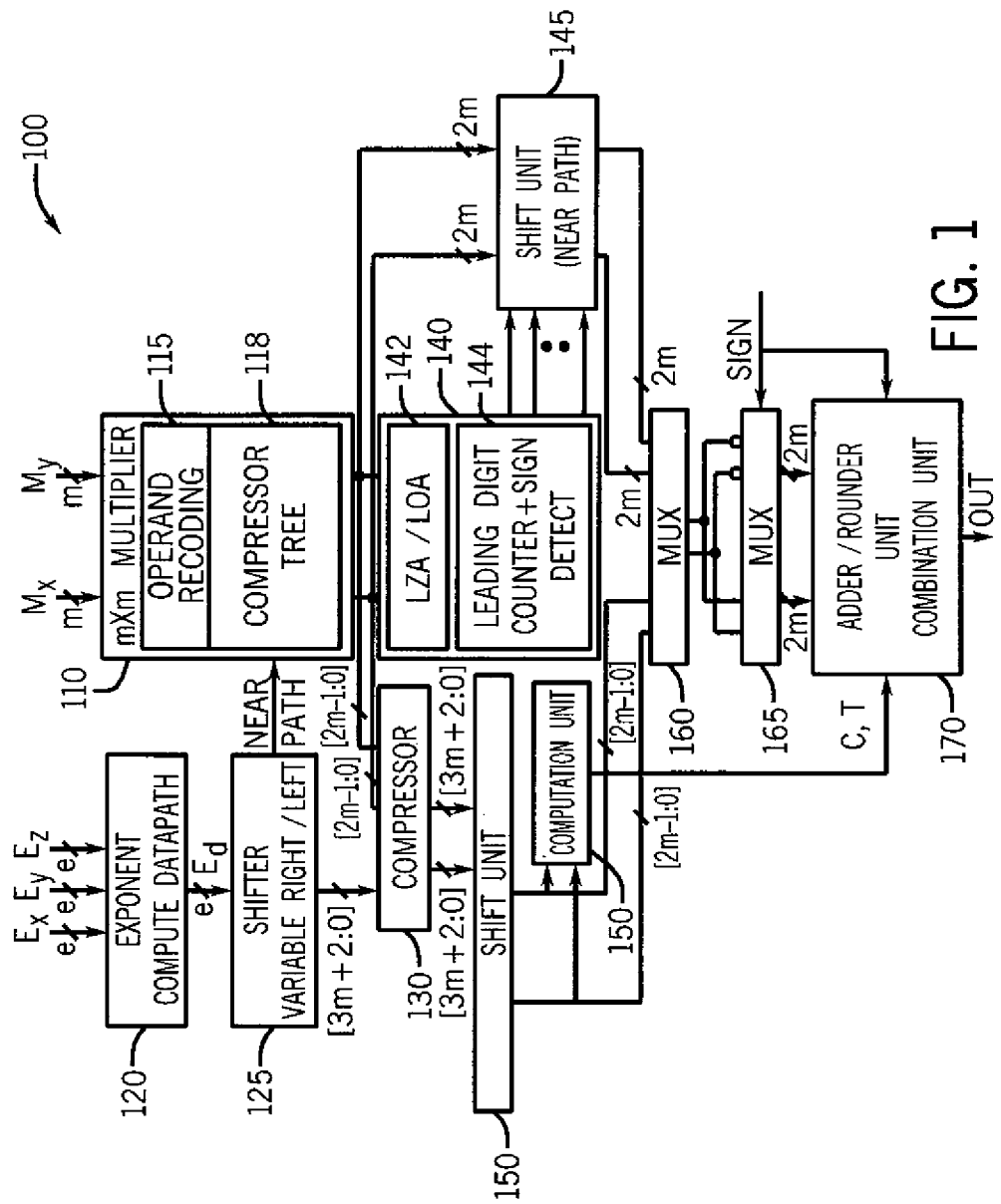
FIG. 1 is a block diagram of a multiply-accumulate unit in accordance with one embodiment of the present invention.

In various embodiments, a split path fused floating-point multiply accumulate (FPMAC) unit may be provided. Specifically, the split path may provide multiple datapaths for handling operations based on the operands. More specifically, a so-called near path and a so-called far path may be provided. The near path may be used to handle critical cases, namely those cases where a difference between exponents of the operands is within a threshold range, while the far path may be used to handle non-critical cases, namely those cases where the difference between the exponents is outside this threshold range. In this way, a performance optimal design may be realized, with optimizations in computing speed, chip area and power consumption, as will be discussed further herein.

While the scope of the present invention is not limited in this regard, in many implementations the MAC unit may be compliant for operands of a given format, e.g., a given Institute of Electrical and Electronics Engineers (IEEE) standard such as a floating point (FP) representation for performing floating-point multiply accumulate operations. Furthermore, a given implementation may be used to handle various types of incoming data, including operands that can be of single and double precision floating point format.

In various embodiments, an ISA may provide multiple user-level fused multiply-accumulate (FMA) instructions. Such FMA instructions can be used to perform fused multiply-add operations (including fused multiply-subtract and other varieties) on packed (e.g., vector) and/or scalar data elements of the instruction operands. Different FMA instructions may provide separate instructions to handle different types of arithmetic operations on the three source operands.

In one embodiment, FMA instruction syntax can be defined using three source operands, where the first source operand is updated based on the result of the arithmetic operations of the data elements. As such, the first source operand may also be the destination operand. For example, an instruction format of: opcode, x1, x2, x3 may be present, where the opcode corresponds to one of multiple user-level FMA instructions to perform a given arithmetic operation, and x1-x3 correspond to operands to be processed in the operation.

The arithmetic FMA operation performed in an FMA instruction can take one of several forms, e.g.:

$r=(x*y)+z;$ $r=(x*y)-z;$ $r=-(x*y)+z;$ or $r=-(x*y)-z.$

In an embodiment, packed FMA instructions can perform eight single-precision FMA operations or four double-precision FMA operations with 256-bit vectors. Scalar FMA instructions may only perform one arithmetic operation on a low order data element, when implemented using vector registers. The content of the rest of the data elements in the lower 128-bits of the destination operand is preserved, while the upper 128 bits of the destination operand may be filled with zero.

In an embodiment, an arithmetic FMA operation of the form, $r=(x*y)+z$, takes two IEEE-754-2008 single (double) precision values and multiplies them to form an infinite precision intermediate value. This intermediate value is added to a third single (double) precision value (also at infinite precision) and rounded to produce a single (double) precision result. Of course, different rounding modes and precisions may be implemented in different embodiments.

Execution units of a processor may include logic to perform integer and floating point operations. Microcode (ucode) read only memory (ROM) can store microcode for certain macro-instructions, including vector multiply-add instructions, which may be part of a packed instruction set. By including packed instructions in an instruction set of a general-purpose processor, along with associated circuitry to execute the instructions, the operations used by many multimedia applications may be performed using packed data in a general-purpose processor. Thus, many multimedia applications can be accelerated and executed more efficiently by using the full width of a processor's data bus for performing operations on packed data. This can eliminate the need to transfer smaller units of data across the processor's data bus to perform one or more operations one data element at a time. In some embodiments, the multiply-accumulate instruction can be implemented to operate on data elements having sizes of byte, word, doubleword, quadword, etc., as well as datatypes, such as single and double precision integer and floating point datatypes.

Some single instruction multiple data (SIMD) and other multimedia types of instructions are considered complex instructions. Most floating-point related instructions are also complex instructions. As such, when an instruction decoder encounters a complex macro-instruction, the microcode ROM is accessed at the appropriate location to retrieve the microcode sequence for that macro-instruction. The various micro-ops for performing that macro-instruction are communicated to, e.g., an out-of-order execution logic, which may have buffers to smooth out and re-order the flow of micro-instructions to optimize performance as they flow through the pipeline and are scheduled for execution. Allocator logic allocates buffers and resources that each uop needs in order to execute. Renaming logic may rename logical registers onto entries in a register file (e.g., physical registers).

In one embodiment, vector instructions can be executed on various packed data type representations. These data types may include a packed byte, a packed word, and a packed doubleword (dword) for 128 bits wide operands. As an example, a packed byte format can be 128 bits long and contain sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15.

Generally, a data element is an individual piece of data that is stored in a single register or memory location with other data elements of the same length. In some packed data sequences, the number of data elements stored in a register can be 128 bits divided by the length in bits of an individual data element. Although the data types can be 128 bit long, embodiments of the present invention can also operate with 64 bit wide or other sized operands.

It will be appreciated that packed data formats may be further extended to other register lengths, for example, to 96-bits, 160-bits, 192-bits, 224-bits, 256-bits or more. In addition, various signed and unsigned packed data type representations can be handled in multimedia registers according to one embodiment of the present invention.

In various embodiments, efficiency may be realized by providing a split datapath within a MAC unit, e.g., a FPMAC unit. A near path may provide for insertion of a third operand, namely the so-called accumulate operand, into an early portion of multiplier hardware, via an early near path accumulate injection into a carry save adder (CSA) tree, removing a 3:2 compression from the critical path. Also, normalization operations performed on various intermediate results can be individually handled in the near and far paths. Still further, post-normalization shifting may be implemented, and a completion adder for performing a wide addition on the near path values (e.g., carry and save values) can be postponed until an end of the FPMAC unit. In addition, in various embodiments certain logic of the unit can be clock/power gated based on the exponent difference to reduce power consumption when such logic is not needed.

In general, the FPMAC may be used to perform a multiply accumulate operation that includes mantissa multiplication of two input operands ($Mx$, $My$), followed by the accumulation or addition of the third operand, $Mz$. In various embodiments, the operands can be represented as standard IEEE floating point normalized numbers (S, F, E), where S depicts the sign (1-bit), F is the fraction (1.F is the m-bit normalized mantissa M) and E the biased exponent (actual exponent(e)+ bias, to make the representation of E positive). Multiplication of the two operands involves mantissa multiplication ($Mx \times My$), e.g., using a carry-save reduction compressor tree-based design, and the output exponent of the product is $Exy=Ex+Ey-$ bias. The accumulation involves alignment of the accumulate mantissa, $Mz$, and the multiply result, $Mxy$, by shifting $Mz$ by a shift amount corresponding to an exponent difference, $d=Exy-Ez$. To improve performance, the exponent difference computation and alignment shift of $Mz$ may be performed in parallel to mantissa multiplication.

Note that the operations involved in various stages of the FPMAC pipeline can differ based on the exponent difference, d. More specifically, in cases with $d>1$ and $d \leftarrow 2$ (so-called far path cases), a large right or left alignment shift (done in parallel to mantissa multiplication), may be performed, followed by a 3:2 compression to reduce the aligned accumulate (Mz), carry (C) and sum (S) terms coming out of the multiplier. In a completion addition only the most significant 'm-bit' sum is required, while the remaining bits are used for computing the carry (C), guard (G), round (R), and sticky bits (T), which may be used for rounding according to the IEEE standard. This is followed by a normalization right shift of worst case 'm+3' (when $d=-(m+3)$). A rounding unit may use the C, G, R and T bits to compute the rounded result.

Instead in cases with $d=\{0, 1, -1, -2\}$ (so-called near path cases), a smaller alignment shift is performed. This shift is followed by a 3:2 compression similar to the earlier case. However, these cases may generate a large number of leading 0s or 1s based on positive or negative value of the result respectively, which requires a worst case of '2m-bit' normalization left shift. In an conventional operation, this would necessitate the computation of the whole '2m-bit' sum (for the completion addition of C and S terms). Instead, in various embodiments to improve performance, a leading zero anticipator (LZA) may be used in parallel with normalization for purposes of sign detection for these near path cases. The normalized result is then used for rounding and the completion add.

The near path clearly forms the critical path and dominates hardware requirements, due to the presence of '2m-bit' sum and '2m-bit' normalize unit along with the LZA. As used herein, the term "critical path" refers to a timing critical path, meaning that this datapath flow has more operations to be performed and thus requires more time to perform these operations. Conventional implementations that perform unified handling of all cases further increase this critical path due to unnecessary inclusion of operations required in unified handling.

Embodiments thus may provide a FPMAC that performs split handling of near and far paths, and may use optimal hardware and logic stages for each of the cases, performing the bare minimal operations required, particularly in the near path. That is, various delay and area optimizations can be present in the near path. As examples, and discussed further below, the near path may provide for early injection of the near path accumulate operand Mz into the multiplication CSA tree, thus removing a 3:2 compression stage from critical path. Second, completion addition may be performed after the normalization shift for both the near and far paths, combined with a rounding unit, thus eliminating an accumulate adder from the critical path, which may provide an area savings, e.g., of a 2m-bit adder. Still further, to further reduce the near path delay, normalization shifting for the near path can be performed in parallel with the LZA on the (C, S) outputs of the CSA tree, which masks the shifting delay with the LZA computation. Yet further, sign detection of the result for conditional 2's complementing can be performed using the existing LZA components for the near path cases, thus completely eliminating a sum computation or a sign detection unit from the critical path and the hardware associated with them.

The far path is non-critical and thus may be designed based on the minimum required operations. Apart from performing minimal number of operations, the split path handling may provide significant power benefits due to the ease of clock/power gating of the near or far paths. That is, when it is determined that a near path operation is to be performed, the far path can be power/clock gated, and vice versa.

As discussed, a FPMAC datapath in accordance with an embodiment of the present invention is split into two different datapaths to separate the critical near path and the non-critical far path. Detailed explanation of a design of an embodiment is described below. Further, understand that while the implementation details are discussed in terms of a single-precision FPMAC unit, embodiments are applicable to other data types such as double precision values.

Referring now to FIG. 1, shown is a block diagram of a FPMAC unit in accordance with one embodiment of the present invention. As seen in FIG. 1, FPMAC 100 may include a split path designed to enable separate operations to be performed for critical cases of the near path, while still providing for efficient performance of far path, non-critical cases. As seen, unit 100 may include an M×M multiplier 110 configured to receive the mantissa portions of first and second operands, Mx and My. These values may be provided to an operand recoding unit 115, which in one embodiment may be a Booth encoder, although the scope of the present invention is not limited in this regard. The recoded operands may be provided to a compressor 118 which, as discussed below may have a 3:2 or 4:2 tree architecture. As further seen, in parallel with this multiplication, an exponent compute datapath 120 may perform arithmetic operations to determine an exponent difference between the three operands, namely by the subtracting the exponent portion of the third operand Ez from the exponent portions of the first and second operands, Ex and Ey, respectively. As discussed further below, an additional bias term may be present.

The determined exponent difference may be provided to an alignment shift unit 125 to control performance of a variable right/left shift on the mantissa of the third operand. As seen, for the case where it is determined that a near par path operation is to be performed (i.e., when the exponent difference Ed is within a predetermined range), a near path injection of the third operand, namely the mantissa of the third operand, can occur directly into compressor tree 118 of multiplier 110.

Still referring to FIG. 1, the product of multiplier 110 may be provided to various locations, including an anticipator unit 140, which may include a leading zero anticipator 142 and a leading digit counter/sign detection unit 144. The determined leading zeros/sign detection operations may be used to provide control signals to a shift unit 145. More specifically, shift unit 145 may be a left shift unit for the near path that performs a normalization shift of up to a 2m bit left shift on the product from multiplier 110 to obtain an intermediate value.

As seen further, the far path may receive the product from the compressor tree of multiplier 110 in a compression unit 130, which may be a 3:2 compression unit. As further seen, compression unit 130 may further receive the variable shift alignment output corresponding to the aligned third operand mantissa. After compression in compression unit 130, the resulting intermediate value corresponding to a carry-save output is provided to a right shifter 150, which in one embodiment may perform a normalization shift using a d-bit right shifter to perform a maximum bit shift of m+3. As seen, the least significant shifted out bits can be provided to a computation unit 155 for calculating carry and sticky bits. While not shown for ease of illustration in FIG. 1, understand that similar computation logic may be present in the near path for such computation, which may be performed after normalization.

More specifically, the resulting shifted intermediate values both from left shift unit 145 and right shift unit 150 may be provided to multiple levels of a selector, namely a first multiplexer 160 and a second multiplexer 165. The resulting selected output is provided to a combination unit 170, which may perform a combined addition/rounding, as well as a post-round normalization to thus generate a final result. As seen, in addition to the incoming intermediate results, unit 170 may receive sign, carry and sticky bits and to control performance of its addition/rounding operations. While shown with this particular implementation in the embodiment of FIG. 1, understand the scope of the present invention is not limited in this regard.

Figure 2:
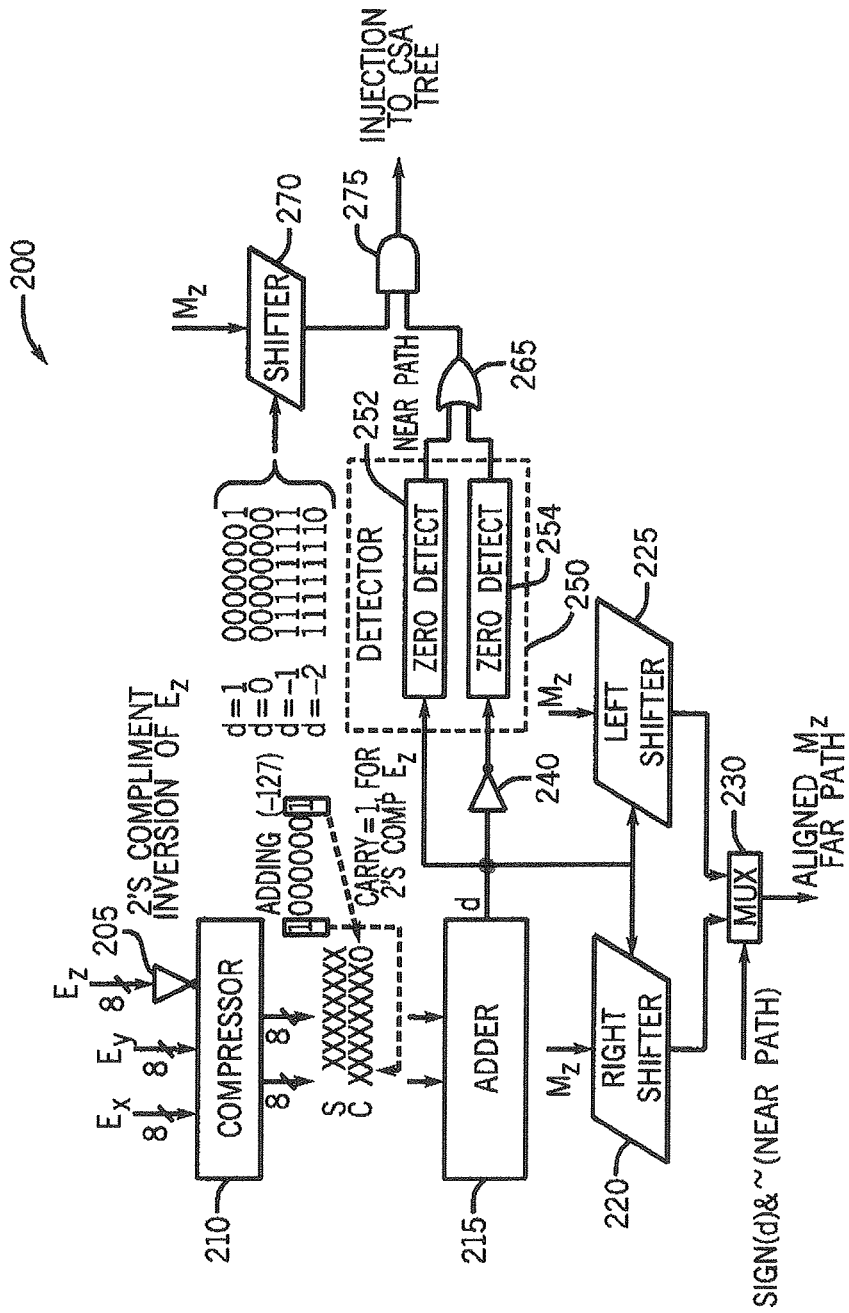
FIG. 2 is a block diagram of an exponent compute datapath in accordance with an embodiment of the present invention.

FIG. 2 is a block diagram showing further details of an exponent compute datapath in accordance with an embodiment of the present invention. As seen, datapath 200 includes various components to perform distance determination with regard to the exponents of the three operands. Still further, various logic to perform detection of the near path cases can be provided to thus enable early injection of the third operand into the multiplication datapath. As seen, a compressor 210, which in one embodiment may be a 3:2 compressor, is coupled to receive the exponents of the three operands. In the embodiment shown in FIG. 2, Ex and Ey may be 8 bit inputs, while the exponent portion of the third operand, Ez, may be coupled to an inverter 205 to provide a two's complement version of Ez to the compressor. Compressor 210 thus calculates exponent difference d=Ex+Ey−Ez, having a sum portion and a carry portion. To provide for the addition of a bias term of a predetermined value, e.g., −127/−1023 for single/double precision, two logic one values may be appended, one to the LSB of carry term and one to the MSB of the sum term. The sum and carry outputs (as modified) may be provided to an adder 215, which in one embodiment may be an 8-bit adder.

As seen in FIG. 2, the difference thus determined in adder 215 may be used to control a pair of shifters, namely a right shifter 220 and a left shifter 225, both of which may be of the far path, while the difference and an inverted version of the difference (via inverter 240) may be provided to a near path detector logic 250, discussed further below. In one embodiment, right shifter 220 may be a 47-bit right shifter (to handle a worst case 47-bit shift), while left shifter 225 may be a 27-bit left shifter (to handle a worst case 27-bit shift). The resulting shifted outputs of the third operand mantissa may be provided to a multiplexer 230, which may select a given shifted value for the mantissa of the third operand to be provided to the far path datapath. In one embodiment, if the difference is determined to be positive (meaning that the first and second operand exponents are greater than the third operand exponent), a right shift operation may be performed, either in right shifter 220 or shifter 270. In contrast, if the difference is determined to be negative, a left shift may be performed, in shifter 225 or shifter 270.

With regard to near path detector logic 250, as shown such logic may include multiple zero bit detectors, namely a first zero detector 252 and a second zero detector 254. The detector outputs may be at a logic high when a zero value is detected, e.g., when a first most significant bits of its input is zero. As an example, the first "m−1" significant bits of the exponent path (for a single precision 8-bit exponent example, the seven MSB's) being 0s or 1s (detected using the 2 zero detectors) may generate a near path flag (Near Path), which may be used to drive injection into the multiplier, and to prevent output to the far path, when enabled. As shown in FIG. 2, these two detector outputs may be provided to logic circuitry 265 which in one embodiment may be an OR gate, the output of which is provided to another logic circuitry 275, which may be an AND gate, further coupled to receive the output of a shifter 270, which in one embodiment may be a one or two bit shifter, depending on the difference. The resulting output from logic 275, which may correspond to the appropriately shifted mantissa of the third operand, may be provided directly to an accumulate portion of the multiplier block, which may be, in one embodiment a 4:2 compressor, although the scope of the present invention is not limited in this regard.

By providing for separate right and left shifters for the far path large shift values (d←−2 and d>1), and at least one other shifter for the near path (e.g., to provide small 1 or 2 bit shifts), improved efficiency may be realized. That is, the near path and far path cases can be handled separately, thereby enabling early availability of the near path shifted accumulate value, to be inserted into the multiplication CSA tree.

Figure 3:
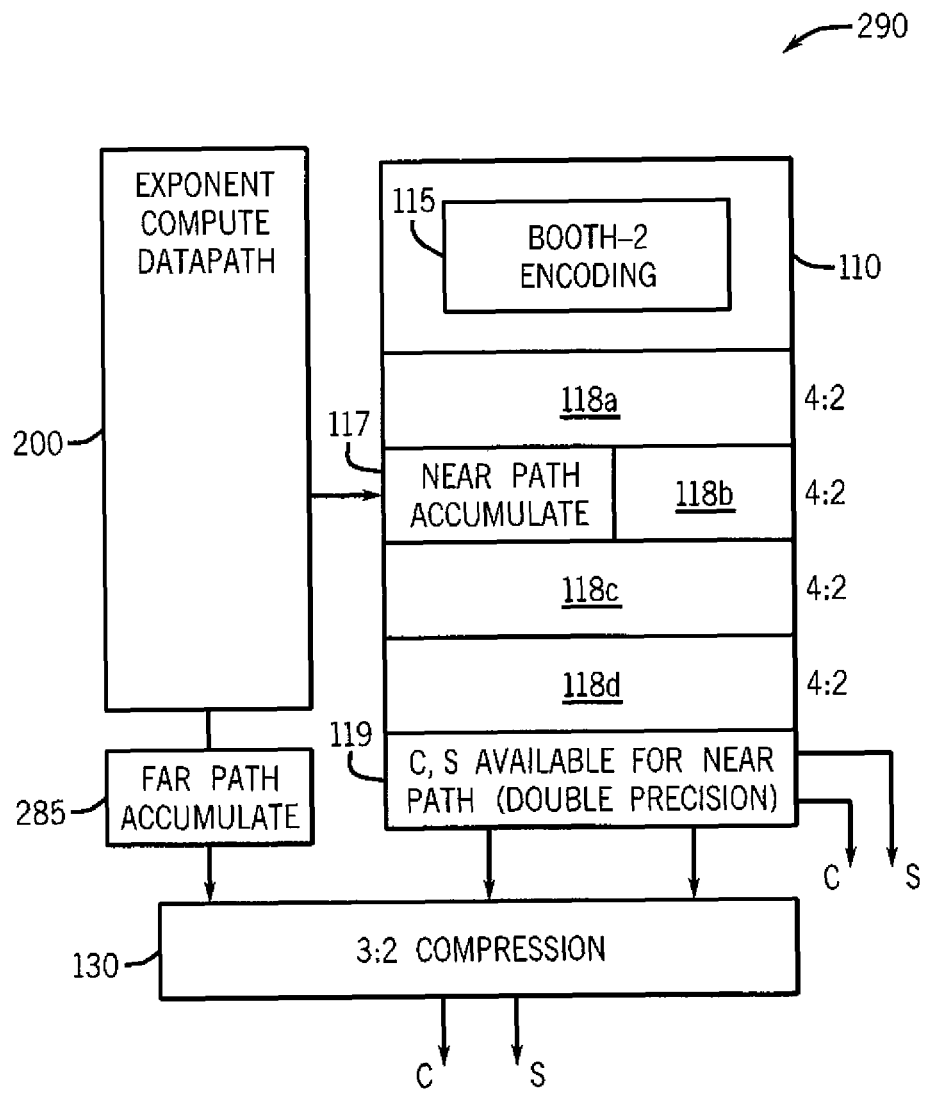
FIG. 3 is a high level block diagram of injection of an accumulate value into a multiplier in accordance with an embodiment of the present invention.

Thus the near path accumulate mantissa, Mz, has a small shift applied to it to be aligned with the multiplication result, Mxy. The early availability of the aligned mantissa provides an opportunity to compress the near path mantissa along with the multiplication CSA tree. Referring now to FIG. 3, shown is a high level block diagram of insertion of the near path accumulate value into the multiplier. As shown in FIG. 3, circuit 290 includes both multiplier 110 such as from FIG. 1 and exponent compute datapath 200, e.g., of FIG. 2. For far path results, exponent compute datapath 200 is coupled to a far path accumulate circuit 285, which in turn passes the shifted accumulate value to a compressor 130, which may perform compression for far path operation.

With regard to multiplier 110, encoder 115 may be a Booth-2 encoder, the output of which is provided to a CSA tree including a plurality of stages 118a-118d, each of which may be implemented via a 4:2 compressor. As further seen, a near path insertion of an accumulate value 117 may be provided into this second compression stage 118b. At the end of the compression tree, carry and sum values may be available for the near path at block 119 (and which may be in double precision format in some embodiments). Instead for far path cases, the results from the compression tree may be provided to a compressor 130.

Figure 4:
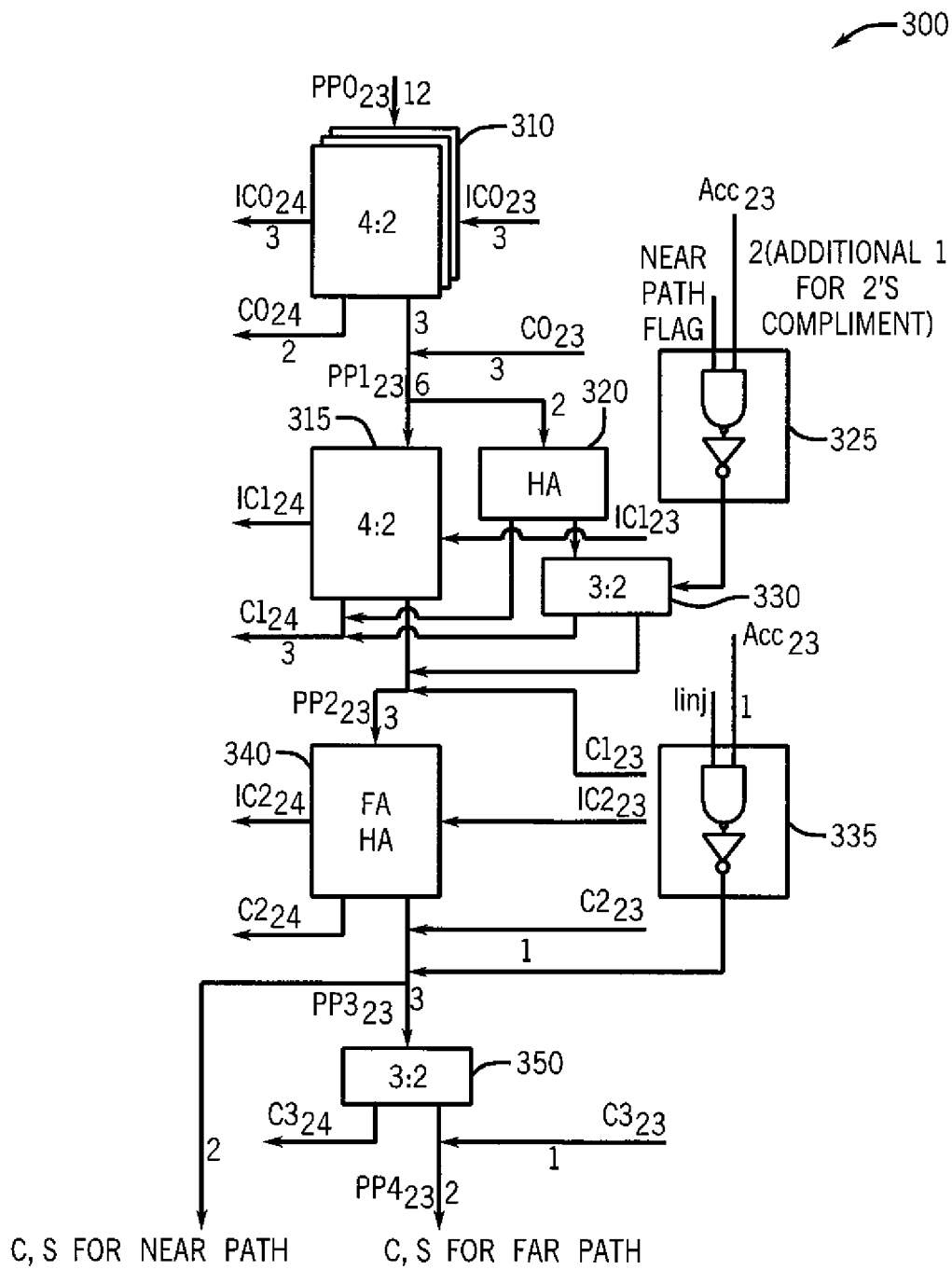
FIG. 4 is a schematic diagram of accumulate injection into a multiplier in accordance with an embodiment of the present invention.

The sparse nature of both the double and single precision floating point multiplication trees enables the near path (C, S) results from the CSA tree to be computed without any additional delay penalty in the critical path. In other words, the multiplier may be configured as a sparse tree configuration, enabling computing efficiency. Referring now to FIG. 4, shown is a schematic diagram of the accumulate injection into a multiplier in accordance with an embodiment of the present invention. As seen in FIG. 4, multiplier 300 is shown for a single bit of the multiplier. More specifically, a first level compressor 310 is coupled to receive, e.g., the partial product along with an intermediate carry value, and to output another intermediate carry value (IC) and a final carry value (C). A second level compressor 315 may receive the output of the first compressor. In addition, a half adder 320 may generate a sum output that is provided to another compressor 330, which may be a clock-gated compressor that is used to perform compression of the accumulate operand when the near path is active (and otherwise the accumulate inputs to the 3:2 compressor will be zero and hence will pass on the HA output to the next stage).

Thus as seen, an accumulate value (shown as ACC 23) is provided through a logic 325 that further receives the Near Path flag. As seen, in one embodiment logic 325 may include a NAND gate and an inverter, which thus is used to provide the accumulate value when active. This compressor 330 provides an output as part of the carry output as well as provides an input to a third level block 340, which in one embodiment may include a full adder followed by a half adder. As further seen, another logic 335 may provide far path accumulate portion which is input along with the output of adder 340 is to a final level compressor 350, which in the embodiment shown may be a 3:2 compressor. Note that this compressor may be of the far path, and in one embodiment corresponds to compressor 130 of FIG. 4. While shown with this particular implementation in the embodiment of FIG. 4, and understand the scope of the present invention is not limited in this regard.

Thus as shown in FIG. 4, by insertion into the middle part of the CSA tree, early computation of the (C, S) for the near-path including the compression of accumulate mantissa avoids an additional 3:2 compression stage and enables their immediate processing, saving one 3:2 compression stage in the critical near path. This near path injection also helps splitting the datapaths for the near and the far paths immediately at the end of the multiplication CSA tree. Such a splitting comes at no additional hardware penalty and helps using the optimal hardware for the rest of the pipeline. Still further, the critical path may be reduced by removing the undue penalties imposed by unified handling of the different cases.

Embodiments may further provide for split handling of normalization shift operations. In one embodiment, the completion addition is performed post-normalization shifting of the (C, S) terms, combined with the rounding. Normalization before the completion addition enables computation of only the required 'm'-bit sum and makes the design performance and hardware optimized. That is, for both the near and far paths, only an m-bit sum needs to be calculated for the completion addition, thus avoiding the need for a further 2m-bit adder for the near path.

Figure 5:
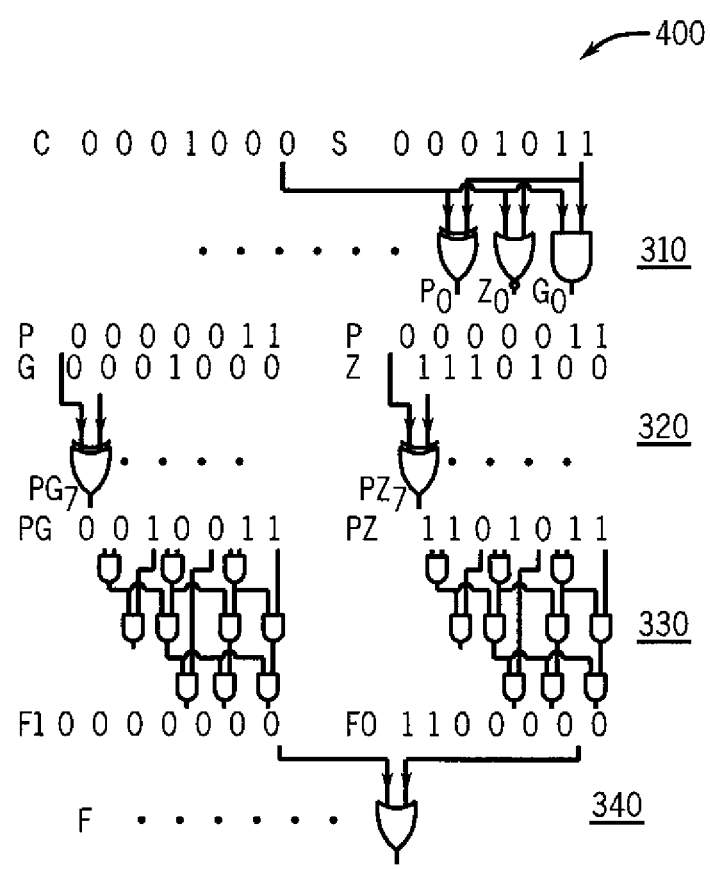
FIG. 5 is a schematic diagram of a leading zero anticipator in accordance with an embodiment of the present invention.

In the separate near path normalization, an effective subtraction may at worst lead to '2m' leading zeroes (or ones) when the 'm' bit accumulate value is equal to a '2m' bit multiplication result in the near path. To determine the left shift amount in such cases with leading zeroes, a LZA may be used. FIG. 5 is a schematic diagram of a leading zero anticipator in accordance with an embodiment of the present invention. As shown in FIG. 5, the LZA generates a string representing the number of leading zeroes (F0) and leading ones (F1). As seen in FIG. 5, LZA 400 includes multiple logic levels, including a first logic level 310, coupled to receive the carry value and the sum value output from the multiplier. In the illustration of FIG. 5, the "A" term corresponds to the carry output, while the "B" term corresponds to the sum term. As seen, in the embodiment of FIG. 5, first logic level 310 may be formed of a plurality of logic gates. Specifically, for each pair of bits of the two terms an AND gate, a not-OR (NOR) gate and an exclusive-OR (XOR) gate may be provided to thus generate a set of outputs corresponding to the sum term (G), the NOR term (Z) and the XOR term (P). As seen, each of these outputs may be provided to second logic level 320, which in the embodiment shown in FIG. 5 may correspond to a set of XOR gates. These XOR gates may generate outputs, namely a PG and a PZ output, each of which are provided to third logic level 330, which may correspond to, in the embodiment shown in FIG. 5, AND trees to thus generate intermediate sums F0 and F1, the results of which can be combined in fourth level logic 340 which in the embodiment shown may correspond to a set of OR gates to thus generate an anticipation string, F.

Figure 6:
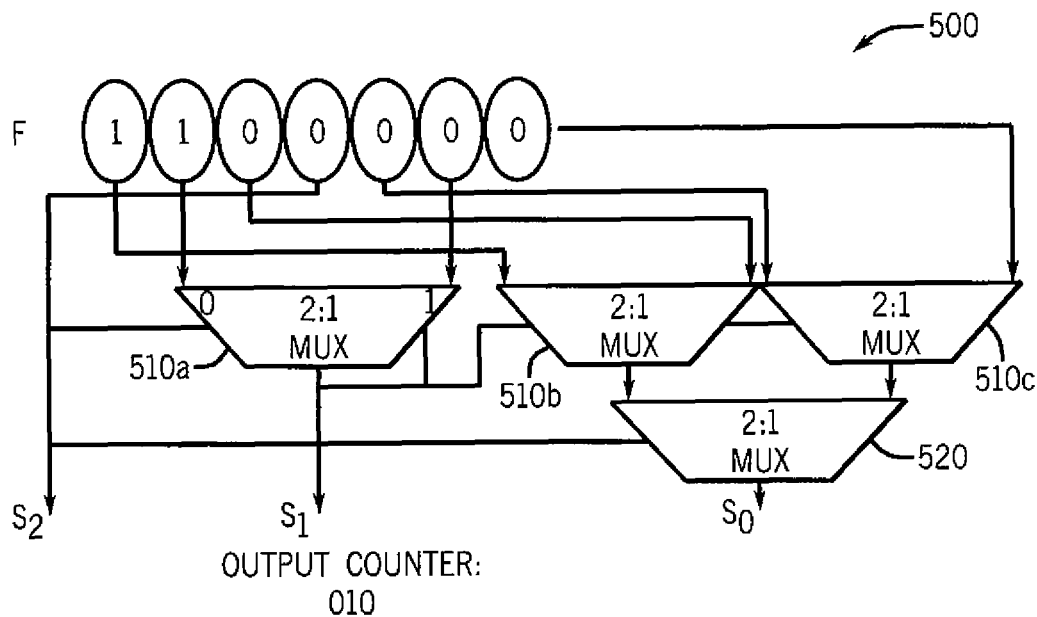
FIG. 6 is a schematic diagram of an embodiment of a leading digit counter in accordance with an embodiment of the present invention.
Figure 7:
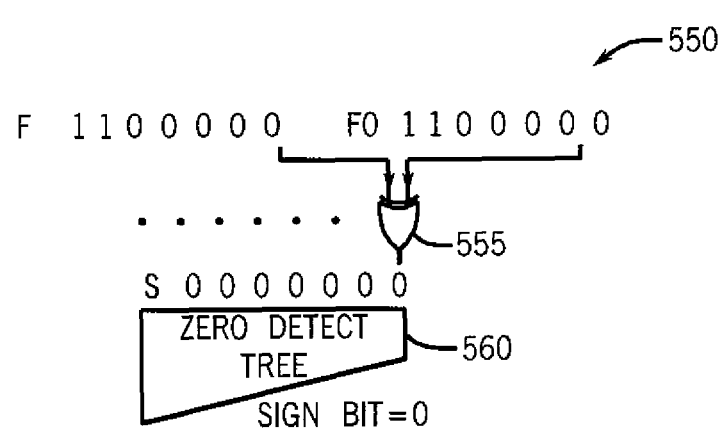
FIG. 7 is a block diagram of a sign detector in accordance with an embodiment of the present invention.

This anticipation string may thus represent the number of leading zeros and/or ones for the multiplier outputs. This string may be binary encoded using a leading digit counter (LDC), an embodiment of which is shown in FIG. 6. In the embodiment shown in FIG. 6, leading digit counter 500 may include a first level of selectors $510_a$-$510_c$, which in the embodiment shown may be 2:1 multiplexers each to receive two bits of the anticipation string, and to pass a selected one of the values, based on control. In addition, selectors $510_a$ and $510_c$ may have their outputs coupled to a second level selector 520, which again may be a 2:1 multiplexer to output of the one of these values based on control, e.g., of a selected bit of the anticipation string. The output of digit counter 500 may be a binary encoding of the leading number of either zero's or ones depending on the case. This string may further be provided to a sign detector 550, shown in FIG. 7 to determine the sign of the output result. As seen, sign detector 550 includes a first level logic 555, each of which may be an XOR gate to combine the anticipation string with the interim result of one of the entries (F0) to thus generate a sign result 560, which is provided to a zero detector tree 565 to thus generate a sign bit. While the scope of the present invention is not limited in this regard, in one embodiment tree 565 may be formed using multiple stages of logic which uses the zero detector circuit, e.g., formed of parallel transistors fed by the inputs and a single clocked pull-up.

The shift amount generated by the LZA may be used by the normalization shifter to perform the left shift on the C, S terms for obtaining a normalized result. The skewed arrival times of binary encoded shift amount from LSB to MSB can be used to mask the normalization shift delay by performing the shifts upon the immediate arrival of the bits in that order. By performing the completion addition along with rounding and sign detection using the LZA, a '2m'-bit summation or sign detection unit can be avoided.

The other parallel path in the normalization unit deals with the far path cases where d>1 & d←−2. As seen with reference back to FIG. 3, the 3:2 compression of the aligned far path mantissa and the (C, S) terms from the CSA tree is performed in compressor 130. Similar to the near path, the completion addition is postponed until the last stage of combined rounding and addition, where the summation is handled for both the near and far paths using a single unit. The normalization shifter for the far path requires a worst case right shifting of the C, S terms by 'm+3' bits, which corresponds to the case when the accumulate value was shifted left for alignment, e.g., d=−(m+3). The bits shifted out of the '2m' range are used to compute the carry and sticky bits, while rounding in the combined sum and rounding unit.

With reference back to FIG. 1, the normalized values (C, S) or (~C, ~S) from either the near path or the far path may be passed on to the combined sum/rounding unit 170 based on the sign of the result determined earlier in logic 135 for the near path (i.e., the LZA and leading digit counter, and zero detect tree), and based on the difference determination for the far path. That is, for far path operation the sign of the result can be determined based on the difference in the exponents and the sign of the input operands. For example, if exponent of the accumulate is bigger than the exponent of the product and the accumulate is positive, then the result would also be positive. The 1's required for completion of the 2's complementing of (C, S) (where needed) are handled in the combined add/round unit 170.

Figure 8:
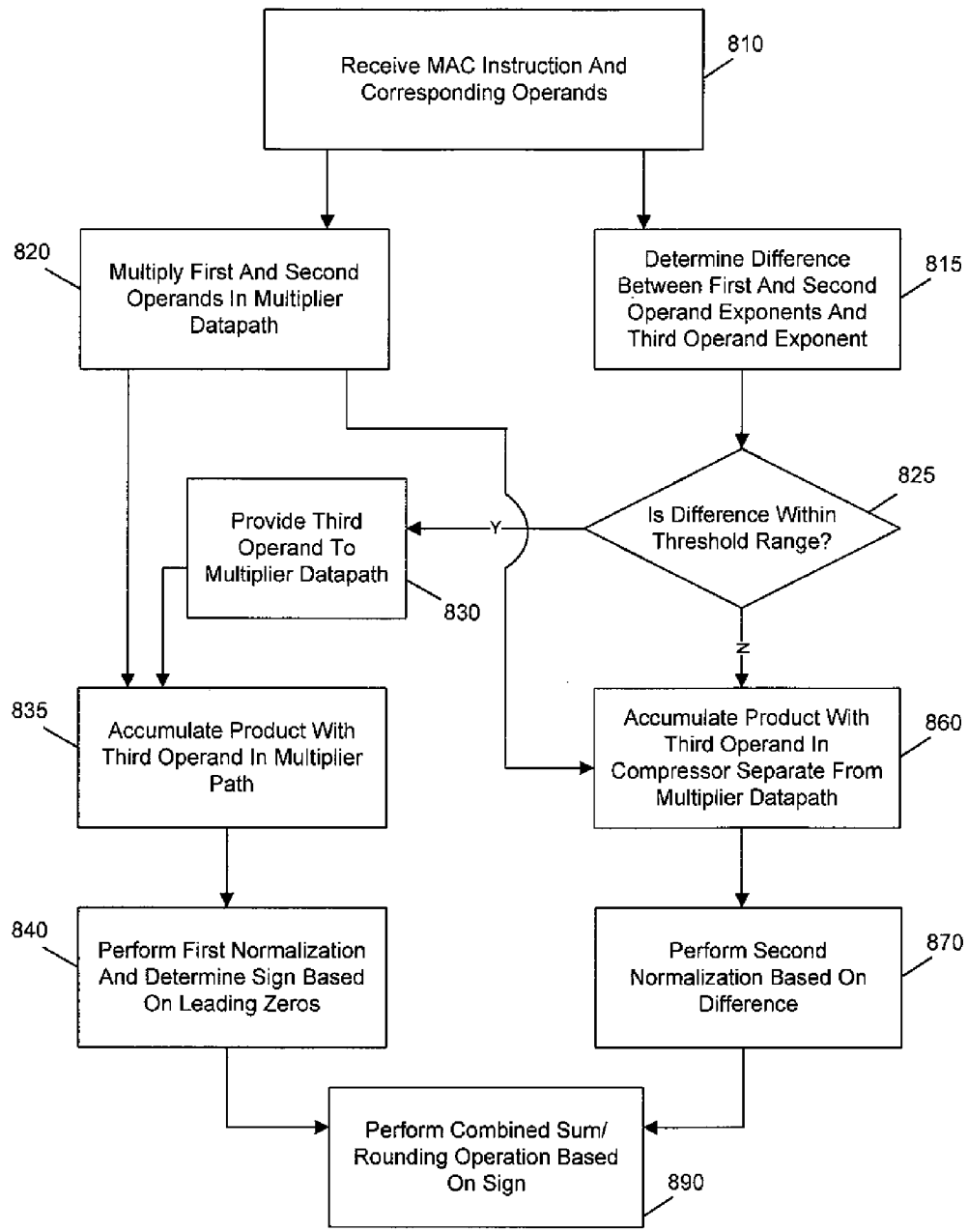
FIG. 8 is a flow diagram of a method in accordance with an embodiment of the present invention.

Referring now to FIG. 8, shown is a flow diagram of a method in accordance with an embodiment of the present invention. As seen in FIG. 8, method 800 may be used to perform a MAC instruction using a MAC unit in accordance with an embodiment of the present invention. As seen method 800 may begin by receiving a MAC instruction and corresponding operands (block 810). This instruction may be a user-level MAC instruction, which may correspond to a one of multiple user level instructions to perform a MAC operation on different types of operands, and which may be received by a processor front end unit. After processing in the front end unit, the instruction is scheduled for execution by a scheduler, which may be an out-of-order scheduler. According to the schedule, the operands may be provided to a selected MAC unit. For example, the three operands may be provided as shown in FPMAC unit 100 of FIG. 1.

Still referring to FIG. 8, at block 815 a difference may be determined between the first and second operand exponents and the third operand exponent. Such operations may be performed in the execute component datapath. Of course understand that in parallel with such exponent compute datapath operations, at block 820 multiplication may begin on the mantissas of the first and second operands, as will be discussed further below. At diamond 825 it may be determined whether the difference is within a threshold range. While the scope of the present invention is not limited in this regard, this difference may correspond to a determination made in the exponent compute datapath with regard to the difference in exponent portions of the first and second operands and the third operand (and possibly a bias value). If the difference is within this threshold range, which is indicative of near path operation, control passes to block 830.

Still referring to FIG. 8, in parallel with the difference calculation and distance determination, the first and second operands may be multiplied in the multiplier datapath (block 820).

If the difference determination at diamond 825 indicates a difference within the threshold control passes to block 830, where the third operand, and more particularly the mantissa of the third operand may be provided to the multiplier datapath. Then at block 835, the product of the first and second operands may be accumulated with the third operand in the multiplier datapath. In this way, the need for a compression operation between the multiplication results and the third operand can be avoided.

Next, control passes to block 840 where a first normalization may be performed and a sign for the final result may be determined based on leading zeros. In this near path operation, the normalization operation may correspond to a left shift operation. Furthermore, the sign determination may be based on a leading zero analysis performed in a leading zero anticipator circuit, which may also receive the output of the multiplication datapath. Finally, at block 890 combined sum and rounding operations can be performed based on the sign value. That is, based on the sign, a 2's complement may be performed, if needed. Also note that in various embodiments this sum operation, corresponding to a completion addition, maybe of m-bit width, avoiding the need for a 2-m bit width addition.

If instead at diamond 825 it is determined that the difference is outside the threshold range, control passes to block 860 where the multiplication product may be provided along with the third operand mantissa to a compressor for accumulation. Note that here however this accumulation is performed separately from the multiplier datapath. Further, a second normalization operation may be performed based on the difference determined above (block 870). Here, the normalization may be a right shift operation. The normalized result may then be provided to block 890, discussed above for the final result to be determined based on completion addition and rounding operations. While shown with this particular implementation in the embodiment of FIG. 8, the scope of the present invention is not limited in this regard.

Thus in various embodiments, split handling of near and far paths may enable performance of the bare minimal operations required on the critical path and may thus provide a performance optimal solution. Still further, by providing for split handling, the not-taken path may be clock gated, e.g., based on a near path flag as described above. This enables turning off all the power consuming normalization shifters and logic blocks and keeping only the required blocks of computation switching, enabling a power optimal design. In addition, total logic levels in terms of basic gates may be reduced, while significantly reducing hardware complexity.

Figure 9:
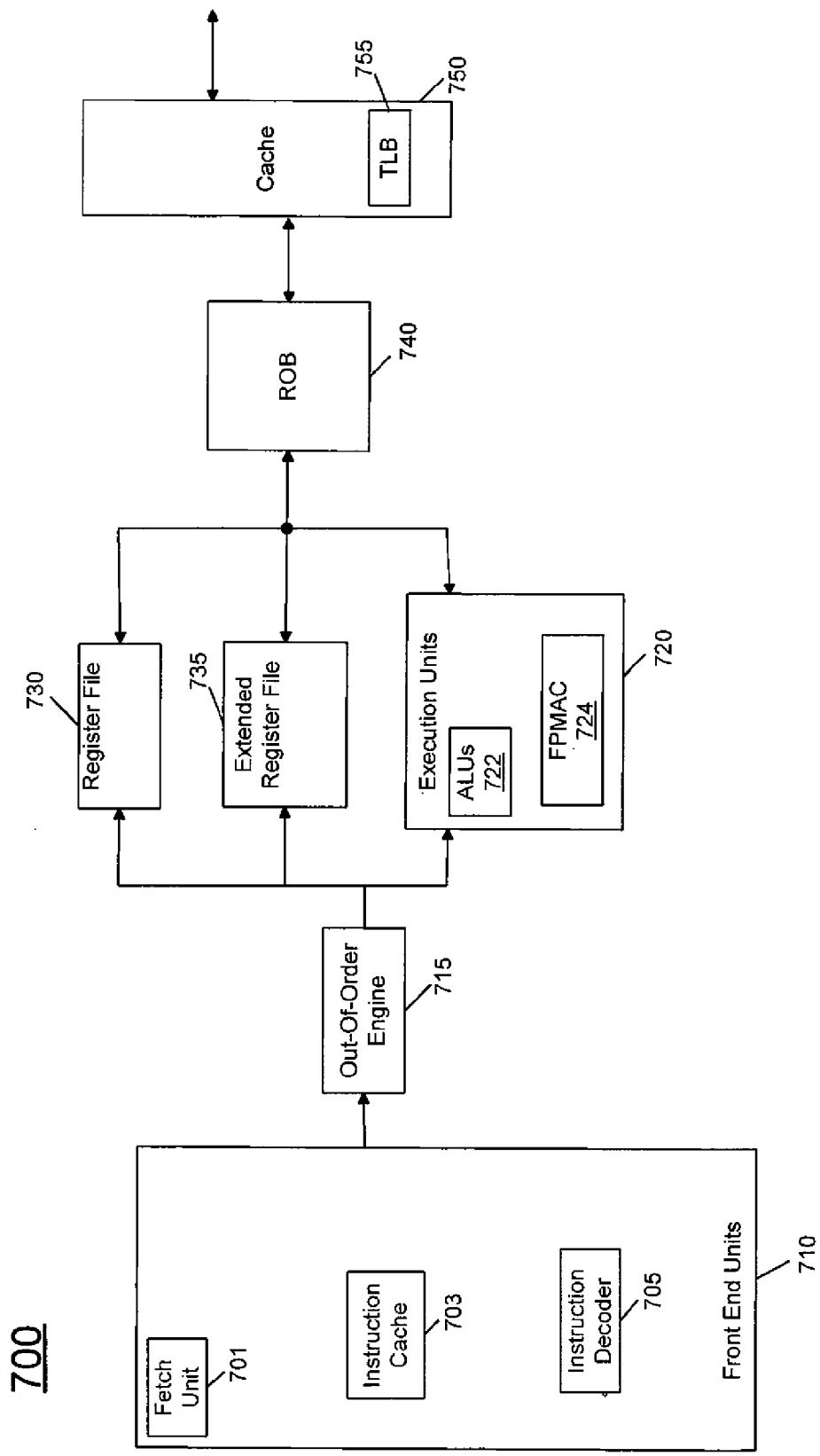
FIG. 9 is a block diagram of a processor in accordance with an embodiment of the present invention.

Embodiments can be implemented in many different systems. For example, embodiments can be realized in a processor such as a multicore processor. Referring now to FIG. 9, shown is a block diagram of a processor core in accordance with one embodiment of the present invention. As shown in FIG. 9, processor core 700 may be a multi-stage pipelined out-of-order processor. Processor core 700 is shown with a relatively simplified view in FIG. 9 to illustrate various features used in connection with a MAC unit in accordance with an embodiment of the present invention.

As shown in FIG. 9, core 700 includes front end units 710, which may be used to fetch instructions to be executed and prepare them for use later in the processor. For example, front end units 710 may include a fetch unit 701, an instruction cache 703, and an instruction decoder 705. In some implementations, front end units 710 may further include a trace cache, along with microcode storage as well as a micro-operation storage. Fetch unit 701 may fetch macro-instructions, e.g., from memory or instruction cache 703, and feed them to instruction decoder 705 to decode them into primitives, i.e., micro-operations for execution by the processor.

Coupled between front end units 710 and execution units 720 is an out-of-order (OOO) engine 715 that may be used to receive the micro-instructions and prepare them for execution. More specifically OOO engine 715 may include various buffers to re-order micro-instruction flow and allocate various resources needed for execution, as well as to provide renaming of logical registers onto storage locations within various register files such as register file 730 and extended register file 735. Register file 730 may include separate register files for integer and floating point operations. Extended register file 735 may provide storage for vector-sized units, e.g., 256 or 512 bits per register.

Various resources may be present in execution units 720, including, for example, various integer, floating point, and single instruction multiple data (SIMD) logic units, among other specialized hardware. For example, such execution units may include one or more arithmetic logic units (ALUs) 722. In addition, a FPMAC unit 724 may be present to generate a final result of a MAC or other instruction scheduled to the unit. In various embodiments, the unit may have a split path as described above.

When operations are performed on data within the execution units, results may be provided to retirement logic, namely a reorder buffer (ROB) 740. More specifically, ROB 740 may include various arrays and logic to receive information associated with instructions that are executed. This information is then examined by ROB 740 to determine whether the instructions can be validly retired and result data committed to the architectural state of the processor, or whether one or more exceptions occurred that prevent a proper retirement of the instructions. Of course, ROB 740 may handle other operations associated with retirement.

As shown in FIG. 9, ROB 740 is coupled to cache 750 which, in one embodiment may be a low level cache (e.g., an L1 cache) and which may also include TLB 755, although the scope of the present invention is not limited in this regard. Also, execution units 720 can be directly coupled to cache 750. From cache 750, data communication may occur with higher level caches, system memory and so forth. Note that while the implementation of the processor of FIG. 9 is with regard to an out-of-order machine such as of a so-called x86 ISA architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 10:
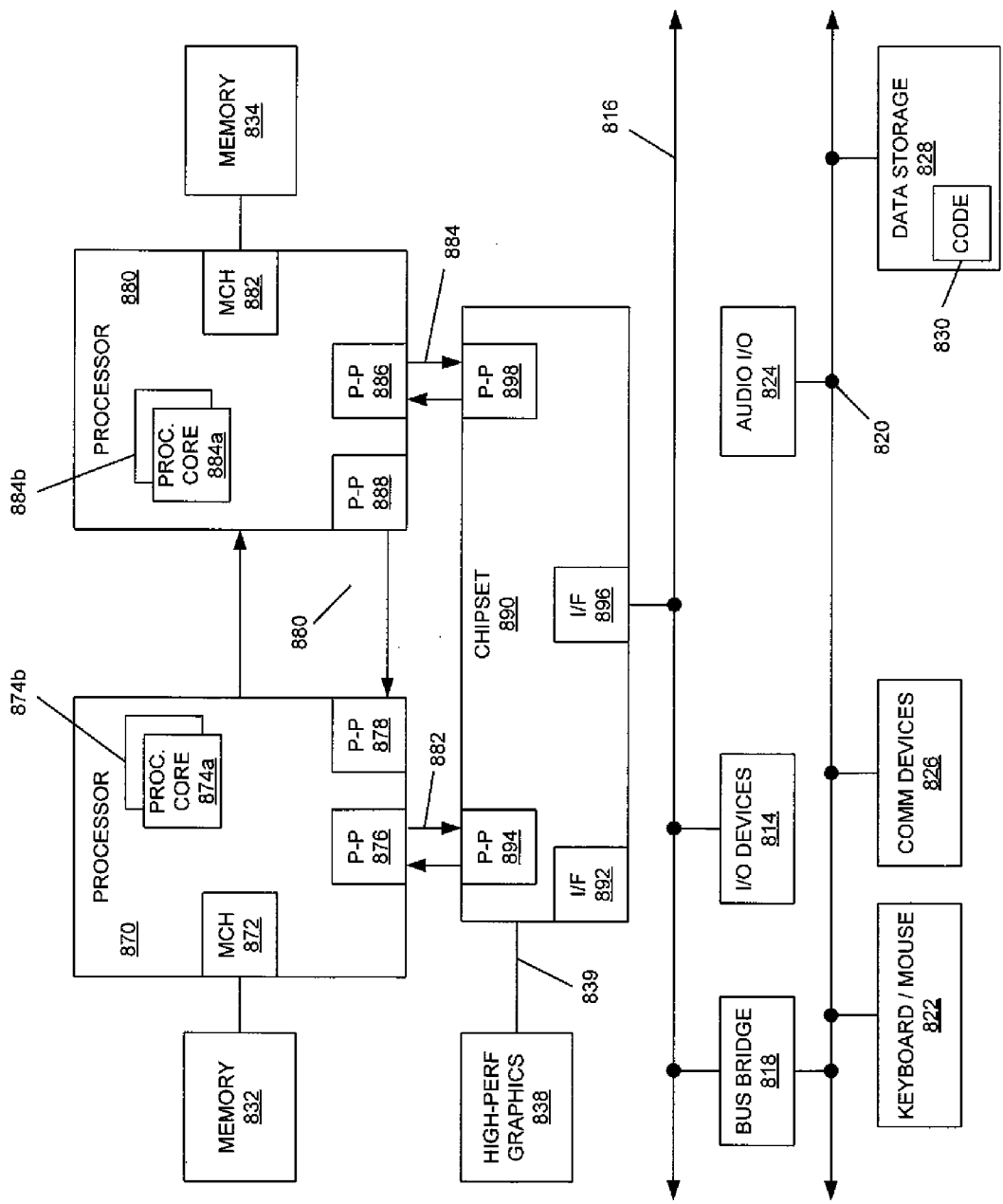
FIG. 10 is a block diagram of a system in accordance with an embodiment of the present invention.

Embodiments may be implemented in many different system types. Referring now to FIG. 10, shown is a block diagram of a system in accordance with an embodiment of the present invention. As shown in FIG. 10, multiprocessor system 800 is a point-to-point interconnect system, and includes a first processor 870 and a second processor 880 coupled via a point-to-point interconnect 850. As shown in FIG. 10, each of processors 870 and 880 may be multicore processors, including first and second processor cores (i.e., processor cores 874*a* and 874*b* and processor cores 884*a* and 884*b*), although potentially many more cores may be present in the processors. As described above, the processor cores may include one or more split path MAC units in accordance with an embodiment of the present invention.

Still referring to FIG. 10, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 10, MCH's 872 and 882 couple the processors to respective memories, namely a memory 832 and a memory 834, which may be portions of main memory (e.g., a dynamic random access memory (DRAM)) locally attached to the respective processors. First processor 870 and second processor 880 may be coupled to a chipset 890 via P-P interconnects 852 and 854, respectively. As shown in FIG. 10, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 10, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820.

Embodiments may be implemented in code and may be stored on a storage medium having stored thereon instructions which can be used to program a system to perform the instructions. The storage medium may include, but is not limited to, any type of non-transitory storage medium such as disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
multiply accumulate (MAC) unit to perform a multiply and accumulate operation on first, second and third operands, the MAC unit including:
an exponent compute datapath to determine a difference based on an exponent portion of the first, second, and third operands, the exponent compute datapath having a first compressor to receive the first, second and third operands and to output a first difference having a first portion and a second portion, an adder coupled to the first compressor to generate the difference using the first and second portions of the first difference, a first shifter to shift a mantissa of the third operand by a first amount if the difference is within a threshold range, a second shifter to shift the third operand mantissa by a second amount, and a third shifter to shift the third operand mantissa by a third amount, if the difference is outside the threshold range;
a multiplier including a multiplication tree, wherein the exponent compute datapath is to provide the shifted third operand mantissa to the multiplier if the difference is within the threshold range;
a second compressor to compress an output of the multiplier and the shifted third operand mantissa if the difference is outside the threshold range, wherein the multiplier output is not to be compressed in the second compressor if the difference is within the threshold range;
a first normalizer to normalize the multiplier output if the difference is within the threshold range;
a second normalizer to normalize the second compressor output if the difference is outside the threshold range;
a computation unit to receive the first and second normalizer outputs and to generate a final value for the multiply and accumulate operation therefrom.

2. The apparatus of claim 1, wherein the first, second and third shifters are to provide a variable shift amount based on the difference.

3. The apparatus of claim 1, wherein the multiplier is not to receive the third operand mantissa if the difference is outside the threshold range.

4. The apparatus of claim 1, further comprising a leading zero anticipator (LZA) coupled to the multiplier output to determine a number of leading zeros of the multiplier output in parallel with operation of the first normalizer.

5. The apparatus of claim 4, wherein the LZA is to further detect a sign for the final value.

6. The apparatus of claim 5, wherein the computation unit is to perform a completion addition operation to generate the final value using the sign detected by the LZA.

7. The apparatus of claim 1, further comprising a controller to gate at least the second compressor and the second normalizer if the distance is within the threshold range.

8. A processor comprising:
a front end unit to fetch and decode a multiply-accumulate instruction having first, second and third operands associated therewith;
a renamer coupled to the front end unit to allocate at least one of the first, second and third operands to a register of a register file;
a multiply-accumulate (MAC) unit coupled to the renamer and having a first path including a multiplier, the first path to handle execution of the multiply-accumulate instruction if a difference between at least a portion of the first and second operands and the third operand is less than a threshold value, and a second path including a compressor, the second path to handle execution of the multiply-accumulate instruction if the difference is greater than the threshold value, wherein a detector is to receive the difference and to cause a portion of the third operand to be provided to the multiplier of the first path if the difference is less than the threshold value, and otherwise the third operand is to be provided to the compressor of the second path.

9. The processor of claim 8, wherein the detector is to cause an output of the multiplier to be provided to the compressor if the difference is greater than the threshold value, and otherwise the multiplier output is to be provided to a shifter of the first path.

10. The processor of claim 9, wherein the MAC unit includes a leading zero anticipator (LZA) coupled to the multiplier output to detect a sign for a result of the multiply-accumulate instruction.

11. The processor of claim 10, wherein the LZA is coupled to the multiplier output and prior to an addition unit that generates the result.

12. The processor of claim 11, wherein the LZA is to determine the sign in parallel with normalization of the multiplier output in a second shifter coupled to the multiplier output.

13. The processor of claim 10, wherein the MAC unit includes a M-bit adder coupled to the multiplier output, the M-bit adder to generate a M×M result using the M-bit adder.

14. The processor of claim 13, wherein the MAC unit does not include a 2m-bit adder.

15. The processor of claim 10, wherein a first normalizer coupled to the multiplier output is to normalize the multiplier output if the difference is less than the threshold value, and a second normalizer coupled to an output of the compressor is to normalize the compressor output if the difference is greater than the threshold value.

16. A method comprising:
receiving first, second, and third operands in a multiply accumulate (MAC) unit;
determining a difference based on exponents of the first, second, and third operands;
providing at least a portion of the third operand to a multiplier datapath of the MAC unit for accumulation with intermediate results of a multiplication operation on at least a portion of the first and second operands if the difference is within a threshold range; and otherwise providing the third operand portion to a compressor for accumulation with a product output by the multiplier datapath.

17. The method of claim 16, further comprising if the difference is within the threshold range, providing the multiplier datapath output to a first normalizer to perform a normalization on the multiplier datapath output in a first direction.

18. The method of claim 17, further comprising if the difference is outside the threshold range, providing the compressor output to a second normalizer to perform a normalization on the compressor output in a second direction.

19. The method of claim 17, further comprising determining a sign for a final output from the MAC unit in parallel with performing the first normalization.

20. The method of claim 16, further comprising if the difference is within the threshold range, powering down a second path of the MAC unit, the second path to be used when the difference is outside the threshold range.

* * * * *